UNITED STATES PATENT OFFICE.

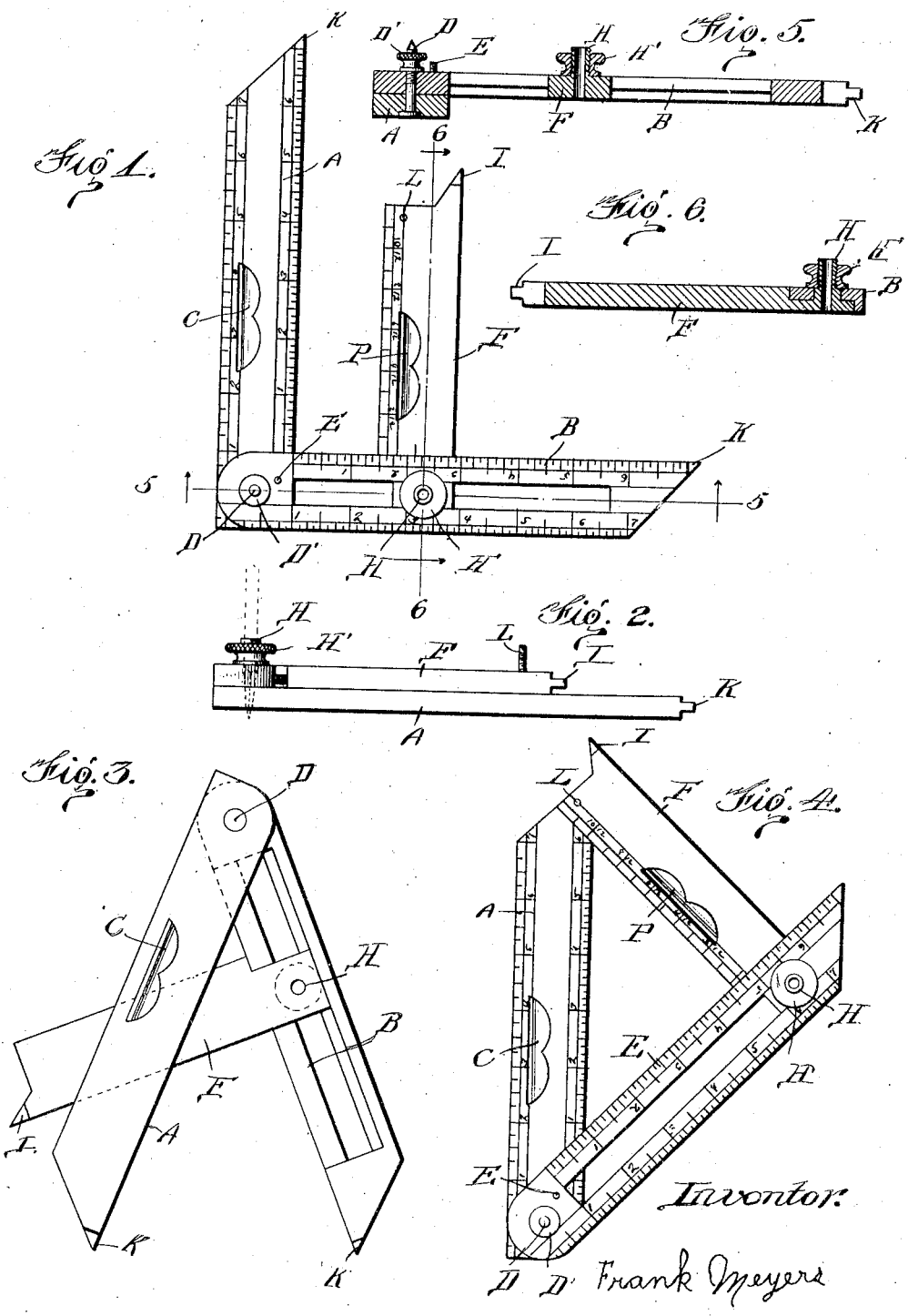
F. MEYERS.
COMPOUND IMPLEMENT.
APPLICATION FILED MAY 1, 1919.
1,339,405. Patented May 11, 1920.

FRANK MEYERS, OF LAUREL, OREGON.

COMPOUND IMPLEMENT.

1,339,405.  Specification of Letters Patent.  Patented May 11, 1920.

Application filed May 1, 1919. Serial No. 293,994.

*To all whom it may concern:*

Be it known that I, FRANK MEYERS, of Laurel, in the county of Washington, State of Oregon, have invented a Compound Implement, in which are combined a level, rule, bevel, plumb, miter, try-square, scriber, marking-gage, compass, caliper, groove-marking-gage, compass, caliper, groove-cleaner, brace, and rafter-gage, of which implement the following is a clear description, reference being had to the accompanying drawing, in which:

Figure 1 is a side elevation of my improved instrument, illustrating its application as a try-square, marking gage and caliper.

Fig. 2 is an edge elevation showing the pencil socket, screw bolt and notched ends.

Fig. 3 is a view of the instrument from the side reverse to that shown on Fig. 1 with the parts differently adjusted.

Fig. 4 is a view of the implement from the same side as Fig. 1 with a still different adjustment of the parts so as to form a miter, rule, square, plumb, level and groove cleaner.

Fig. 5 shows a section on the line 5—5, and

Fig. 6 is a section on the line 6—6 of Fig. 1.

Like letters of reference indicate like parts in the various figures.

A is the arm which has the level glass C, B is the body which is slotted longitudinally and rabbeted on one side as shown in Figs. 3, 5 and 6. F is the finger which has the level glass P. The arm A is pivoted to the body B by means of a pointed screw D having a thumb nut D' by which the arm can be held in any angular adjustment with reference to the body. E is a small screw threaded through the body B and adapted to engage a socket in arm A so as to hold the arm and body at right angles to one another. The finger F is adapted for adjustment along body B; and, for this purpose, the finger is rabbeted at one end as shown in Fig. 6 so as to fit into the rabbet of the body and provide a projection fitting the groove of the body. The finger is provided with a screw-stud H through which and the finger there is an aperture adapted to receive a marking pencil. Screwing upon the stud H is a thumb-nut H' by which the finger may be clamped in place on the body B. The finger is reduced at its free end to provide a groove cleaner I adapted for insertion in the grooves of flooring and the like.

In Fig. 4 the implement is shown with all parts joined and fastened together, parts A and F being connected by means of a small screw L similar to screw E. In this form any workman will easily recognize its various uses. The body B and arm A can be used as a rule, level, plumb, try-square, miter and groove cleaner. To use the implement as a compass, loosen screw L and slide the finger to the center of the body and turn the arm A to the position shown in Fig. 3, the points K then become the compass points. To use the implement as a circle scriber turn the same bottom side up from the position shown in Fig. 5 and place a pencil in the socket of screw H. Then place the pointed end of screw D at the center of the circle to be described and slide the finger to the required place on the body so that the distance between the screw and the pencil point will equal the radius of the circle to be described.

The instrument may be used as a caliper when adjusted as shown in Fig. 1 and the bolt or bar, the diameter of which is to be measured, is placed between the arm A and finger L and its diameter may be read on the scale of the body. To use as a marking gage place the pencil in the socket of the screw H, as before, and place the edge of A in contact with the edge of the work to be marked; adjust the slide F so as to bring the pencil at the required place and slide the implement along the work.

Having thus described my invention, I desire to secure by Letters Patent the following claims:

1. The combination of the parts A, B and F, the parts A and B being pivotally connected at one end the part B being longitudinally slotted and rabbeted and the element F being so rabbeted transversely at one end as to fit into said rabbet and slot of the part B and thus be longitudinally slidable therealong while maintained at right angles thereto and means for clamping parts A, B and F in the position to which they may be adjusted.

2. The elements of claim 1 with the free ends of the parts A, B and F pointed by beveling as shown.

3. The elements of claim 1 with the pivot between parts A and B axially pointed and the clamping means for part F including a screw bored to receive a marking pencil.

4. The combination covered by claim 1 with means for fixedly connecting part A to part F at a particular angle.

5. The combination covered by claim 1 with means for fixedly connecting the parts A and B together outside their pivot when the two are at right angles to one another.

FRANK MEYERS.